Patented Nov. 11, 1930

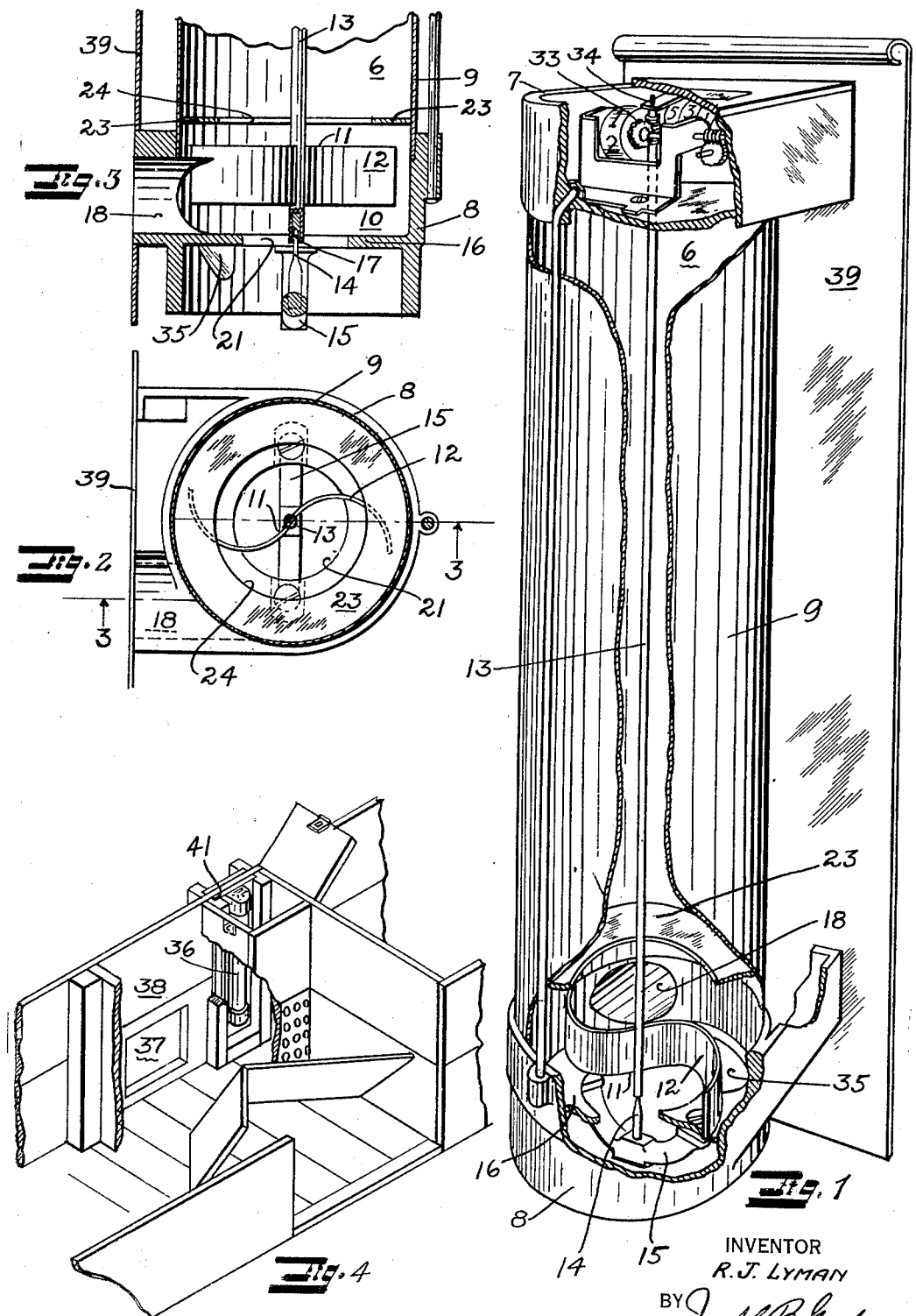

1,781,466

UNITED STATES PATENT OFFICE

RAY J. LYMAN, OF BERKELEY, CALIFORNIA, ASSIGNOR TO GREAT WESTERN METER COMPANY, OF OAKLAND, CALIFORNIA, A CORPORATION OF CALIFORNIA

FLUID METER

Application filed July 5, 1924. Serial No. 724,251.

My invention relates to fluid meters and particularly to meters used in measuring the volumetric flow of liquids in open channels.

An object of the invention is to provide a fluid meter of the character described which will be simple in structure and yet will be extremely accurate in recording fluid flow under varying conditions.

Another object of the invention is to provide a fluid meter arranged to be operated by a turbine having the motor vanes and chambers arranged and shaped to insure speed of rotation varying directly with the amount of water passing through the meter.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a perspective view of the meter of my invention, portions of the outside being broken away to show the interior structure.

Figure 2 is a plan view of the portion of the device arranged to operate the recording mechanism.

Figure 3 is a side sectional view taken substantially on the broken line 3—3 in Figure 2.

Figure 4 is a perspective view showing the meter of my invention installed for use in connection with an orifice arranged in a liquid carrying channel.

In meters heretofore used for measuring the flow of liquids over weirs and through orifices considerable inaccuracy of record has resulted under varying conditions of use. Such inaccuracy has been chiefly due to the fact that the speed of the turbines hitherto used for operating such devices does not vary directly with the flow of water therethrough, particularly when the operating head is low. In accordance with my invention, however, I provide a turbine for operating a revolution counting mechanism, which has the motor and motor chamber thereof so formed that accuracy of record is extremely high over a wide range of operating heads.

The device in the present embodiment of my invention, is particularly arranged for use in measuring liquids escaping through an orifice and, as here shown, comprises a vertically disposed cylindrical chamber 6 defined within and between top and bottom members 7 and 8 respectively, and the walls of a connecting cylindrical shell 9. Mounted in a portion 10 of the chamber 6 defined within the bottom member 8 is a rotor 11 which, as here shown, comprises vanes 12 fixed to a shaft 13, the latter being pivotally supported on a pivot pin 14 fixedly mounted on a yoke-like member 15 which is fixed to the bottom member 8 externally of the chamber. The vanes, which are preferably formed of a non-corroding metal, are shaped to closely approximate a particular form in order to produce the desired result. Each vane is preferably formed as a segment of a cylindrical shell, the top and bottom edges thereof defining planes perpendicular to the axis of its cylinder. The vanes of an assembled rotor are preferably so related that the axes of curvature of an oppositely disposed pair intersect lines tangent to one vane and passing through the tip of the other, and the surfaces of the vanes are tangent at their juncture which, it will be noted, is at the shaft. It will be readily understood that the use of sheet metal for forming the vanes permits the formation of a pair of vanes from a single strip of metal, such strip being preferably inserted and secured at its midpoint in a perforation provided in the shaft. The rotor 11 is preferably positioned in spaced relation from the end wall 16 of the bottom member 8 and the side walls of the chamber. The bearing of the shaft 13 preferably comprises a bore 17 extending longitudinally thereinto and in which the pivot pin is arranged. In this manner, danger of silt, or other solid substances which might occur in the water, interfering with the operation of the device or causing an undue wear on the parts is reduced to a minimum.

The water is arranged to be introduced into the chamber 6 through a passage 18 provided in the member 8, the axis of said passage being directed substantially tangent to the circular path of the outer portion of the vanes and preferably intersecting said vanes in their lower portion. An outlet for the water is provided in the bottom end wall 16, said outlet comprising a circular opening 21, preferably centrally disposed in said wall and having an area substantially one fourth that of the bore of the chamber.

It will now be noted that as water is introduced into the chamber through the passage 18 the major portion of the stream will impinge against the vanes 12 and then be centrifugally directed to travel along the chamber walls. The pressure so created will tend to raise the water, the outermost portion tending to rise highest, so that the free surface of the water will define a funnel shape. The water which escapes from the chamber through the opening 21 may reach the opening in two distinct manners; it may fall directly through the opening, or it may pass outwardly and upwardly to form the funnel and thence work down the incline of the funnel to finally descend through the central portion of the motor. But the portion of the introduced water which goes to make the funnel is not constant, it being noted that a rapidly increasing proportion will travel by way of the funnel as the supply rate increases. Since the water of the funnel tends to travel at a slower rate than the rotor vanes, the descending water in passing through the vanes will actually retard their motion.

As previously noted, a given increase in the rate of water input will cause more than a proportional increase in the amount of water delivered downward from the water funnel and hence in the retarding effect. Since without retardation the speed of the motor would tend to increase substantially as the square of the water input, by the use of my device the tendency to such disproportionate increase in motor speed would be counteracted by the retarding effect referred to and the net effect would be a speed appreciably less than the unretarded speed.

It will now be clear that if the retarding effect could be further increased, a point might be reached when it might be made to exactly overcome the tendency of the motor to acquire a rotative speed in excess of one varying directly with the amount of water passing through the meter. It having been found that with the foregoing described construction, the before mentioned retarding effect is not sufficient to hold the motor speed to values directly varying with the amount of water flowing, means are provided for still further increasing the retarding effect until the desired adjustment is reached.

Preferably fixed in the chamber at a distance above the motor vanes substantially equal to that between said vanes and the bottom end wall 16 is an annular ring 23, the opening 24 thereof embracing substantially half the area of the chamber section. The ring 23 thus serves to divide the chamber into two distinct portions, one containing the rotor and the other serving as what may for convenience be termed a fluid reservoir. In this manner the rise of water at the periphery of the chamber is prevented and the water which is forced above the ring 23 is forced there at the lower pressure existing at the edge of the ring, with the result that the water of the funnel formed above the ring will have a slower circling movement and hence will deliver water down its slope at a still slower rate to provide a larger retarding effect than would be produced without the ring in position. To obtain the ideal performance of the motor, then, it is merely necessary to ascertain the size of ring opening 24 which will cause the motor to record speeds directly proportional to the quantity of water passing through the meter. Thus, for example, with a chamber of $3\frac{3}{8}''$ diameter the combination of the opening 24 having a diameter of $2\frac{5}{16}''$ and the bottom outlet opening 21 having a diameter of $1\frac{9}{16}''$, and with the motor formed as described, yields an almost ideal performance curve over the full range of depths for which the meter is designed. In other words, the continued ratio of the cylinder cross sectional area to the area of opening 24 to the area of the opening 21 will be substantially the ratio of 4 to 2 to 1 for the particular combination cited.

A suitable revolution counter and recording device 33 is preferably mounted in the top member 7, the same also being provided with a top bearing 34 for the shaft 13 which is arranged to operate the recording device 33. Silt and other foreign matter are caused to be trapped and expelled from the chambers through a rearwardly sloping trap opening 35 provided in the bottom end wall 16.

It will now be further noted that the use of the meter with a portion of the same submerged will be the most usual operating condition, particularly when a meter is used to measure an orifice discharge, the water funnel referred to in any case extending above the submergence level. In use, the ratio of the orifice opening to the inlet opening must, of course, be known to give the proper factor for obtaining the stream flow in terms of the registered meter flow. A typical installation is shown in Figure 4, a meter 36 being here shown installed adjacent on orifice 37 formed in a partition 38.

To provide for the ready insertion and removal of a meter used in a meter box such as is here shown the device is preferably provided with a backing plate 39 secured thereto and arranged to be removably engaged in a suitable guideway 41 provided adjacent the edges of a suitable opening in the wall 38, the passage 18 extending through said plate so that it may receive water through said opening.

It will now be noted that an extremely simple means has been provided for varying the relation of the quantity of water flowing through a meter of the type described to the pressure head which causes such flow. Thus a meter may be produced to give quantity readings exactly conforming to the hydraulic flow formula. $Q = CA\sqrt{2gh}$, in which Q represents quantity per unit time, C represents a necessary constant, A represents the cross section area of the inlet passage, $g$ represents the acceleration of gravity and $h$ the pressure head. And it will furthermore be noted that desired deviations from the ideal performance curve may be as readily produced.

I claim:—

1. A fluid meter comprising a casing defining a vertically disposed cylindrical chamber and provided with an inlet passage through which fluid is adapted to flow tangentially into the chamber and an axially disposed outlet opening at an end of said cylinder, a rotatable shaft extending axially through said chamber, curved vanes mounted on said shaft and each vane having the curved portion thereof cylindrically curved about an axis parallel to said shaft, and a revolution counter arranged to be actuated by said shaft.

2. A fluid meter comprising a casing defining a vertically disposed cylindrical chamber, a rotor coaxially mounted for rotation in said chamber and having radially extending vanes, each of said vanes presenting an impact surface substantially that of a segment of the inside surface of a cylinder having its axis parallel to that of said chamber, said casing being provided with an inlet passage to said chamber from which fluid is adapted to flow against said impact surfaces of said vanes and an axially disposed outlet for said fluid at the bottom of said chamber, and a revolution counter arranged to be actuated by said rotor.

3. A fluid meter comprising a casing having defined therein a pair of vertically and coaxially disposed cylindrical chambers having a centrally disposed open passage connecting them, a rotor coaxially mounted in the lower of said chambers, said casing being provided with an inlet passage to said lower chamber from which fluid is arranged to be discharged horizontally against said blades and said casing also being provided with an outlet passage from said lower chamber, said upper chamber being arranged to receive fluid from said lower chamber during the operation of the meter.

4. A fluid meter comprising a casing divided by horizontal partition walls to define therein a reservoir and a cylindrical chamber, said chamber having centrally disposed circular openings in the end walls thereof, said openings being of unequal size and the smaller opening being arranged to serve as an outlet for said chamber and said reservoir being connected to the chamber through the larger of said openings; a rotor mounted in said chamber registering apparatus arranged to be actuated by said rotor; the wall of said chamber being provided with a fluid intake passage arranged to discharge fluid against said rotor to cause the rotation thereof.

5. A fluid meter comprising a casing having defined therein a vertically disposed cylindrical chamber having a centrally disposed circular opening in the lower end wall thereof, a revolution counter, a rotatable shaft extending axially through said chamber and arranged to operate said counter, and vanes mounted on said shaft mediately of the ends of said chamber, said vanes having their surfaces substantially cylindrically curved about axes parallel to said shaft, oppositely disposed vanes being mutually tangent at their juncture with said shaft and the axes of curvature thereof passing through lines drawn from each blade tip tangent to the surface of the oppositely disposed vane, the side wall of said chamber being provided with a fluid intake passage arranged to discharge fluid horizontally against said vanes.

6. A fluid meter comprising a casing defining a vertically disposed cylindrical chamber having a centrally disposed opening in each end thereof; a rotor coaxially mounted in said chamber having vanes cylindrically curved about axes parallel to the axis of rotation of said rotor, and horizontally disposed top and bottom edges; a revolution counter operatively associated with said rotor; said casing being provided with a fluid intake passage in the side wall of said chamber arranged to discharge a stream of fluid therefrom in such manner that the axis of the discharged stream will be substantially tangent to the circle of movement of the outer portions of said vanes and will intersect said vanes in the lower half thereof.

7. A fluid meter comprising a casing defining a vertically disposed cylindrical chamber provided with centrally disposed circular openings in the upper and lower ends thereof and having the continued ratio of the area of an end to the area of the opening in the upper end to the area of the opening in the lower end substantially in the ratio of four to two to one; a revolution counter, a rotor coaxially mounted in said cylinder and having curved vanes, said rotor being operatively associated with said revolution counter; the side wall of said chamber being provided with a fluid intake passage arranged to discharge a stream of fluid horizontally against said vanes in such manner that the axis of said stream will intersect said vanes in the lower half thereof.

8. A fluid meter comprising a casing having defined therein a vertically disposed cylindrical chamber provided with centrally disposed unrestricted circular openings in the upper and lower ends thereof and having the ratio of the area of an end to the area of the opening in the upper end to the area of the opening in the lower end substantially in the continued ratio of four to two to one; a rotatable shaft extending centrally through said openings; a revolution counter operatively connected to said shaft; vanes mounted on said shaft in symmetrically spaced relation from the ends and walls of said chamber, said vanes having their surfaces substantially cylindrically curved about axes parallel to said shaft and having their top and bottom edges horizontal; means in said casing defining therein an upwardly extending reservoir connected to said chamber by means of said upper opening, and a fluid intake passage provided in a side of said chamber and arranged so that the axis of the stream of fluid discharged therefrom will be horizontal and will intersect said vanes in the lower half thereof.

9. In a fluid meter arranged for operation under different pressure heads, a casing for a fluid operated turbine, a rotor in said casing, a revolution registering device, and a partition dividing the casing transversely of the axis of rotation of the rotor into rotor and reservoir compartments, and providing a passage between said compartments whereby fluid may pass through said passage into and from said reservoir for maintaining the ratio of the turbine speed to the quantity of fluid at a substantially constant value.

10. In a fluid meter, a casing, a horizontal partition in said casing defining a chamber and a reservoir respectively below and above it, said chamber being cylindrical and vertically disposed and having a circular centrally disposed opening in the bottom end wall thereof embracing substantially one-fourth the area of such end and arranged to serve as an outlet passage therefor, said partition being provided with a circular centrally disposed opening embracing substantially one-half the area of the adjacent chamber end, a rotor coaxially mounted in said chamber, said casing being provided with an inlet passage through which fluid is arranged to be discharged into said chamber and against said rotor to effect the rotation thereof.

In testimony whereof, I have hereunto set my hand at Oakland, California, this 30th day of June, 1924.

RAY J. LYMAN.